(12) United States Patent
Xu et al.

(10) Patent No.: US 10,539,850 B2
(45) Date of Patent: Jan. 21, 2020

(54) DISPLAY SCREEN, DISPLAY DEVICE AND DISPLAY METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaoling Xu, Beijing (CN); Yanfeng Wang, Beijing (CN); Yun Qiu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/674,573

(22) Filed: Aug. 11, 2017

(65) Prior Publication Data
US 2018/0188576 A1    Jul. 5, 2018

(30) Foreign Application Priority Data

Jan. 3, 2017    (CN) .......................... 2017 1 0001774

(51) Int. Cl.
*G02F 1/139*    (2006.01)
*G02F 1/1337*   (2006.01)
*G02F 1/13*     (2006.01)
*G02F 1/1347*   (2006.01)
*G02F 1/1333*   (2006.01)

(52) U.S. Cl.
CPC .......... *G02F 1/1393* (2013.01); *G02F 1/1323* (2013.01); *G02F 1/13475* (2013.01); *G02F 1/133723* (2013.01); *G02F 2001/133302* (2013.01); *G02F 2202/04* (2013.01)

(58) Field of Classification Search
CPC ............. G02F 1/13475; G02F 1/13737; G02F 1/13725; G02F 1/1393; G02F 1/133555; G02F 1/1323; C09K 19/60
See application file for complete search history.

(56) References Cited

U.S. PATENT DOCUMENTS 3,967,881 A * 7/1976 Moriyama .......... G02F 1/13475
                                                        349/78
4,241,339 A * 12/1980 Ushiyama ........... G02F 1/13475
                                                        345/22
(Continued)

FOREIGN PATENT DOCUMENTS

CN        1908746 A      2/2007
CN      101075040 A     11/2007
(Continued)

OTHER PUBLICATIONS

First Office Action for Chinese Application No. 201710001774.X, dated Feb. 25, 2019, 10 Pages.

*Primary Examiner* — Jia X Pan
(74) *Attorney, Agent, or Firm* — Brooks Kushman P.C.

(57) ABSTRACT

A display screen, a display device and a display method are provided. The display screen includes: a display panel and a dye liquid crystal cell. The dye liquid crystal cell is arranged on a side of the display panel, and the dye liquid crystal cell is configured to control an emergent direction of light that has been transmitted through the dye liquid crystal cell under the influence of an electric field.

15 Claims, 6 Drawing Sheets

(56) References Cited

U.S. PATENT DOCUMENTS

| | | | | |
|---|---|---|---|---|
| 4,490,015 | A | * | 12/1984 | Kawarada ............ G02F 1/13725 252/299.01 |
| 5,296,952 | A | * | 3/1994 | Takatsu ............... G02F 1/13476 349/77 |
| 5,305,126 | A | * | 4/1994 | Kobayashi ......... C09K 19/3852 349/183 |
| 6,621,541 | B1 | * | 9/2003 | Choi .................. G02F 1/133555 349/113 |
| 2004/0100598 | A1 | * | 5/2004 | Adachi ............. G02F 1/133536 349/113 |
| 2007/0030240 | A1 | | 2/2007 | Sumiyoshi et al. |
| 2007/0268427 | A1 | * | 11/2007 | Uehara ................ G02B 6/0016 349/62 |
| 2008/0055535 | A1 | * | 3/2008 | Chiba .................... C09K 19/60 349/165 |
| 2008/0094551 | A1 | * | 4/2008 | Hayashi .............. G02F 1/13475 349/106 |
| 2010/0060825 | A1 | * | 3/2010 | Jang ........................ B82Y 20/00 349/86 |
| 2013/0162924 | A1 | | 6/2013 | Sahouani et al. |
| 2014/0285751 | A1 | | 9/2014 | Min et al. |
| 2015/0301364 | A1 | | 10/2015 | Feng |
| 2016/0275875 | A1 | | 9/2016 | Wei |
| 2016/0320644 | A1 | * | 11/2016 | Kim ....................... G02F 1/1334 |
| 2017/0276960 | A1 | * | 9/2017 | Osterman .............. G02C 7/022 |

FOREIGN PATENT DOCUMENTS

| | | |
|---|---|---|
| CN | 101673525 A | 3/2010 |
| CN | 103097951 A | 5/2013 |
| CN | 103383505 A | 11/2013 |
| CN | 103441139 A | 12/2013 |
| CN | 103988121 A | 8/2014 |
| CN | 104732168 A | 6/2015 |
| CN | 204557017 U | 8/2015 |
| CN | 205182069 U | 4/2016 |
| CN | 106054423 A | 10/2016 |
| CN | 106249492 A | 12/2016 |
| CN | 106526956 A | 3/2017 |
| JP | H0973070 A | 3/1997 |
| KR | 20080001174 A | 1/2008 |
| KR | 20130067339 A | 6/2013 |

* cited by examiner

DISPLAY SCREEN, DISPLAY DEVICE AND DISPLAY METHOD

CROSS REFERENCE TO RELATED APPLICATION

This application claims priority to Chinese patent application No. 201710001774.X, filed with the Chinese State Intellectual Property Office on Jan. 3, 2017, which is incorporated herein by reference in its entirety.

FIELD

The disclosure relates to the field of display, and in particular to a display screen, a display device and a display method.

BACKGROUND

With the development of society, various electronic devices such as a mobile phone, a computer and a television set are more and more inseparable from people's lives. The electronic devices provide a lot of conveniences for people while may also bring a personal information leakage problem. Taking a display device as an example, the existing display device has a large viewing angle, which is very disadvantageous for personal information security. Therefore, a display device having an anti-sight function attracts more and more attention.

In the related art, a privacy film is usually provided in the display device and arranged between a backlight module and a display module. The privacy film includes a lens and a light-absorbing member around the lens. The lens converges the light in the viewing angle and the similar visual angle, the transmitted light is increased, thereby increasing the display brightness. The light-absorbing member absorbs light of large angles other than the viewing angle, reducing the viewing angle to achieve the anti-sight purpose.

The privacy film of the above-mentioned display device can achieve the anti-sight purpose, but the degree of the viewing angle is fixed, and the user needs to view contents on the display screen plumb in the front face of the display screen of the display device. Therefore, the display device has low anti-sight flexibility.

SUMMARY

A display screen, a display device and a display method are provided according to embodiments of the disclosure, so as to solve the problem that the display device in the related art has low anti-sight flexibility. The technical solutions are described as follows.

In a first aspect, a display screen is provided according to the disclosure, which includes: a display panel and a dye liquid crystal cell. The dye liquid crystal cell is arranged on a side of the display panel, and the dye liquid crystal cell is configured to control an emergent direction of light that has been transmitted through the dye liquid crystal cell under the influence of an electric field.

Optionally, the dye liquid crystal cell is arranged on a light entering side of the display panel, and the dye liquid crystal cell includes a first transparent substrate, a second transparent substrate and a dye liquid crystal layer. The first transparent substrate and the second transparent substrate are arranged opposite to each other, and the dye liquid crystal layer is arranged between the first transparent substrate and the second transparent substrate. A first conductive layer is arranged on the first transparent substrate; a first alignment layer is arranged on the first transparent substrate on which the first conductive layer has been arranged; a second conductive layer is arranged on the second transparent substrate; and a second alignment layer is arranged on the second transparent substrate on which the second conductive layer has been arranged.

Optionally, the display panel includes a first substrate and a second substrate arranged in a light entering direction, and the first transparent substrate is the first substrate.

Optionally, the dye liquid crystal layer comprises dye stuff and nematic liquid crystals.

Optionally, a display mode of the nematic liquid crystals is an electrically controlled birefringence mode.

Optionally, the display screen further includes a backlight module, and the backlight module is configured to emit light toward the dye liquid crystal cell.

Optionally, the dye liquid crystal layer comprises dye stuff and nematic liquid crystals, the dye stuff is configured to absorb a portion of light emitted by the backlight module, and an angle between the portion of light and the display screen is a preset angle.

Optionally, both the first transparent substrate and the second transparent substrate are glass substrates or polyethylene terephthalate (PET) substrates.

Optionally, both the first conductive layer and the second conductive layer are indium tin oxide (ITO) layers, and both the first alignment layer and the second alignment layer are polyimide (PI) layers.

In a second aspect, a display device is provided according to the disclosure, which includes the display screen described in the first aspect.

In a third aspect, a display method is provided according to the disclosure, the display method is applied to the display screen described in the first aspect, the display screen includes: a display panel and a dye liquid crystal cell, the dye liquid crystal cell is arranged on a side of the display panel. The display method includes: emitting light to the dye liquid crystal cell when an image is needed to be displayed; and applying voltages to the dye liquid crystal cell to generate an electric field in the dye liquid crystal cell, wherein the dye liquid crystal cell is capable of controlling an emergent direction of light that has been transmitted through the dye liquid crystal cell under the influence of an electric field and absorbing preset light, and an angle between the preset light and the display screen is a preset angle. Optionally, the dye liquid crystal cell is arranged on a light entering side of the display panel, the dye liquid crystal cell includes: a first transparent substrate, a second transparent substrate and a dye liquid crystal layer, the first transparent substrate and the second transparent substrate are arranged opposite to each other, and the dye liquid crystal layer is arranged between the first transparent substrate and the second transparent substrate, a first conductive layer is arranged on the first transparent substrate, a first alignment layer is arranged on the first transparent substrate on which the first conductive layer has been arranged, a second conductive layer is arranged on the second transparent substrate, and a second alignment layer is arranged on the second transparent substrate on which the second conductive layer has been arranged. Applying the voltages to the dye liquid crystal cell to generate the electric field in the dye liquid crystal cell includes: applying the voltages to the first transparent substrate and the second transparent substrate to generate the electric field in the dye liquid crystal cell.

Optionally, the display panel includes a first substrate and a second substrate arranged in a light entering direction, and the first transparent substrate is the first substrate.

Optionally, the dye liquid crystal layer comprises dye stuff and nematic liquid crystals, and the dye stuff is capable of absorbing the preset light.

Optionally, a display mode of the nematic liquid crystals is an electrically controlled birefringence mode.

Optionally, the display screen further includes a backlight module, and emitting the light to the dye liquid crystal cell includes: controlling the backlight module to emit the light toward the dye liquid crystal cell.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 2-1 is a schematic structural diagram of a display screen according to an embodiment of the disclosure;

FIG. 2-2 is another schematic structural diagram of a display screen according to an embodiment of the disclosure;

FIG. 2-3 is yet another schematic structural diagram of a display screen according to an embodiment of the disclosure;

FIG. 3 is a flowchart of a display method according to an embodiment of the disclosure;

FIG. 4-1 is a flowchart of a method for manufacturing a display screen according to an embodiment of the disclosure;

FIG. 4-2 is a schematic diagram of forming a first transparent substrate according to the embodiment shown in FIG. 4-1;

FIG. 4-3 is a schematic diagram of forming a first conductive layer according to the embodiment shown in FIG. 4-1;

FIG. 4-4 is a schematic diagram of forming a first alignment layer according to the embodiment shown in FIG. 4-1;

FIG. 4-5 is a schematic diagram of forming a second transparent substrate according to the embodiment shown in FIG. 4-1;

FIG. 4-6 is a schematic diagram of forming a second conductive layer according to the embodiment shown in FIG. 4-1;

FIG. 4-7 is a schematic diagram of forming a second alignment layer according to the embodiment shown in FIG. 4-1;

FIG. 4-8 is a schematic diagram of forming a dye liquid crystal layer according to the embodiment shown in FIG. 4-1; and FIG. 4-9 is a schematic diagram of a dye liquid crystal cell obtained according to the embodiment shown in FIG. 4-1.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
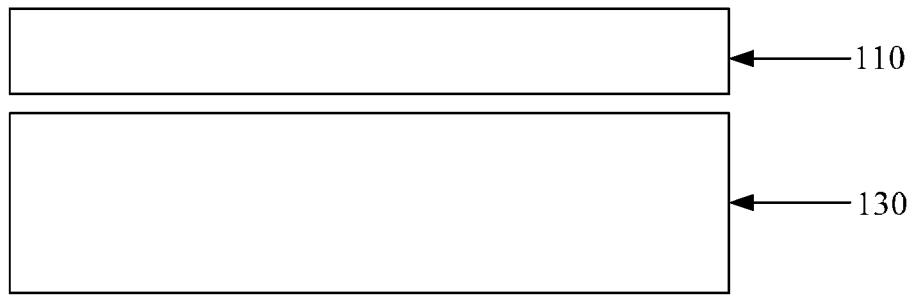
FIG. 1 is a schematic diagram of a total structure of a display screen according to an embodiment of the disclosure.

A display screen is provided according to an embodiment of the disclosure, as shown in FIG. 1, the display screen 100 includes: a display panel 110 and a dye liquid crystal cell 130.

The dye liquid crystal cell 130 is arranged on a side of the display panel 110, and the dye liquid crystal cell 130 is configured to control an emergent direction of light that has been transmitted through the dye liquid crystal cell 130 under the influence of an electric field.

Since the dye liquid crystal cell is capable of controlling an emergent direction of light that has been transmitted through the dye liquid crystal cell 130 under the influence of an electric field, the viewing angle can be varied continuously by the dye liquid crystal cell in a case that the electric field is applied continuously.

To sum up, for the display screen according to the embodiment of the disclosure, the display screen includes a dye liquid crystal cell, the dye liquid crystal cell is arranged on a side of the display panel, and the dye liquid crystal cell is capable of controlling an emergent direction of light that has been transmitted through the dye liquid crystal cell under the influence of an electric field. Therefore, the viewing angle can be varied continuously. As compared with the related art, the user does not need to view contents on the display screen plumb in the front face of the display screen, and the anti-sight flexibility is improved.

Figures 1, 2:
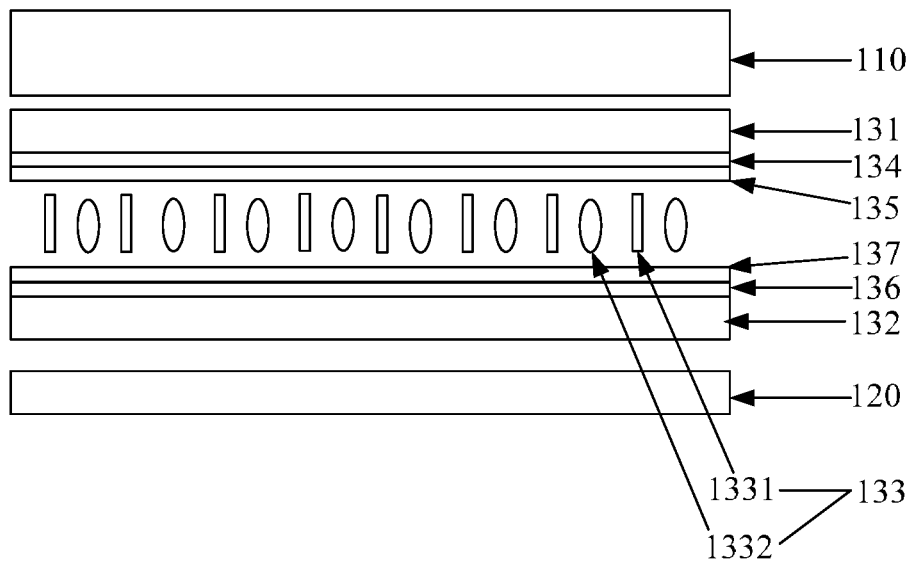
Figure 2:
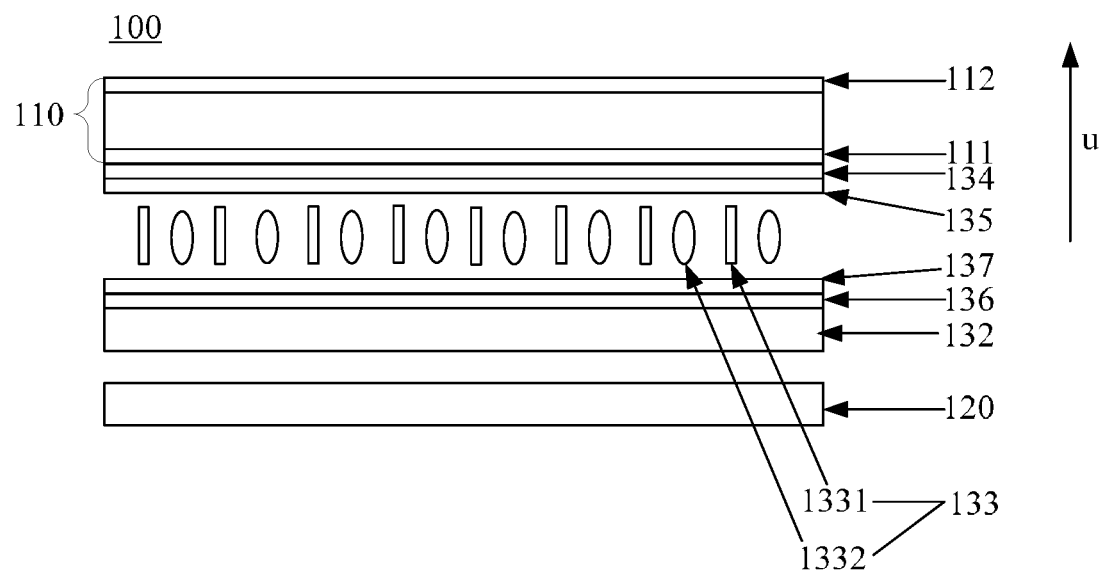

Optionally, the dye liquid crystal cell is arranged on a light entering side of the display panel, as shown in FIG. 2-1, the dye liquid crystal cell includes a first transparent substrate 131, a second transparent substrate 132 and a dye liquid crystal layer 133.

The first transparent substrate 131 is oppositely arranged to the second transparent substrate 132, and the dye liquid crystal layer 133 is arranged between the first transparent substrate 131 and the second transparent substrate 132. By way of example, the first transparent substrate 131 and the second transparent substrate 132 may be glass substrates; alternatively, the first transparent substrate 131 and the second transparent substrate 132 may be polyethylene terephthalate (abbreviated as PET) substrates, which is not defined in the embodiment of the disclosure.

A first conductive layer 134 is arranged on the first transparent substrate 131. The first conductive layer 134 may be an indium tin oxide (abbreviated as ITO) layer.

A first alignment layer 135 is arranged on the first transparent substrate 131 on which the first conductive layer 134 has been arranged. The first alignment layer 135 may be a polyimide (abbreviated as PI) layer.

A second conductive layer 136 is arranged on the second transparent substrate 132. The second conductive layer 136 may be an ITO layer.

A second alignment layer 137 is arranged on the second transparent substrate 132 on which the second conductive layer 136 has been arranged. The second alignment layer 137 may be a PI layer.

Further, as shown in FIG. 2-1, the display screen 100 further includes a backlight module 120, and the backlight module 120 is configured to emit light toward the dye liquid crystal cell. The light entering side of the display panel is a side of the display panel close to the backlight module. The reference sign 110 represents a display panel in FIG. 2-1.

In the embodiment of the disclosure, the dye liquid crystal cell is arranged on a light entering side of the display panel. As compared with the related art, the user does not need to view contents on the display screen plumb in the front face of the display screen, and the brightness of the display screen is high. Therefore, the anti-sight flexibility is improved and the display quality is improved.

A display screen is provided according to another embodiment of the disclosure, as shown in FIG. 2-2, the display screen 100 includes: a display panel 110 and a dye liquid crystal cell. The dye liquid crystal cell is arranged on a light entering side of the display panel 110, and the dye liquid crystal cell is configured to control an emergent direction of light that has been transmitted through the dye liquid crystal cell under the influence of an electric field. The display panel 110 includes a first substrate 111 and a second substrate 112 arranged in a light entering direction (e.g., a direction indicated by the reference sign u shown in FIG. 2-2).

The dye liquid crystal cell includes a first transparent substrate, a second transparent substrate 132 and a dye liquid crystal layer 133. The first transparent substrate is the first substrate 111. The second transparent substrate 132 may be a glass substrate, or may also be a PET substrate.

The first transparent substrate and the second transparent substrate 132 are arranged opposite to each other, and the dye liquid crystal layer 133 is arranged between the first transparent substrate and the second transparent substrate 132.

A first conductive layer 134 is arranged on the first transparent substrate. The first conductive layer 134 may be an ITO layer.

A first alignment layer 135 is arranged on the first transparent substrate on which the first conductive layer 134 has been arranged. The first alignment layer 135 may be a PI layer.

A second conductive layer 136 is arranged on the second transparent substrate 132. The second conductive layer 136 may be an ITO layer.

A second alignment layer 137 is arranged on the second transparent substrate 132 on which the second conductive layer 136 has been arranged. The second alignment layer 137 may be a PI layer.

Referring to FIG. 2-1 and FIG. 2-2, the dye liquid crystal layer 133 includes dye stuff 1331 and nematic liquid crystals 1332. The dye stuff is configured to absorb a portion of light with large angles (for the portion of the light, an angle between the portion of light and the display screen is a preset angle) emitted by the backlight module. By way of example, the dye may be a dichroism dye stuff. The nematic liquid crystals are configured to enable the light emitted by the backlight module to be transmit through, and the dye liquid crystal layer is configured to converge the light emitted by the backlight module. A display mode of the nematic liquid crystals is an electrically controlled birefringence (abbreviated as ECB) mode. In this display mode, the dye stuff and the nematic liquid crystals are changed together with the change of the electric field in the dye liquid crystal cell. In the case that the light emitted by the backlight module is incident on the outer wall of a rod-like dye stuff, the light may be absorbed by the dye stuff. In the case that the light emitted by the backlight module is incident on the nematic liquid crystals along the symmetrical axis of the nematic liquid crystals, the entirety of the light is transmitted through the nematic liquid crystals. When an image is needed to be displayed, the backlight module is controlled by the control unit to emit light toward the dye liquid crystal cell, and the voltages are applied to the dye liquid crystal cell. Specifically, the voltages are applied to the first transparent substrate and the second transparent substrate to generate an electric field between the first transparent substrate and the second transparent substrate. With the change of the applied voltages, the intensity of the electric field between the first transparent substrate and the second transparent substrate changes. When the intensity of the electric field changes, the dye stuff and the nematic liquid crystals are deflected together. The portion of the light (for which an angle between the portion of light and the display screen is the preset angle) emitted by the backlight module and incident on the outer wall of the rod-like dye stuff are absorbed by the dye, so as to reduce the viewing angle and achieve the anti-sight purpose. The portion of light emitted by the backlight module and incident on the nematic liquid crystals is transmitted in the axial direction of the nematic liquid crystals, and the axial direction of the nematic liquid crystals changes continuously, so as to change the viewing angle continuously. The meanings of other reference signs in FIG. 2-2 may be illustrated by referring to FIG. 2-1.

In the following, the electrically controlled birefringence mode is illustrated. In the case that voltages are applied to the liquid crystal cell and an electric field is generated in the liquid crystal cell, due to the anisotropy of the liquid crystal dielectric constant and the conductivity, the liquid crystal is subjected to a force that changes the orientation of the liquid crystal axis, and the torque caused by the electric field can cause the liquid crystal axis to be rotated. In this case, the optical properties of the liquid crystal cell are different from that of the liquid crystal cell before the voltages are applied, and the birefringence of the liquid crystal may be affected by the electric field. This mode is referred as the electrically controlled birefringence mode.

Figures 2, 3:
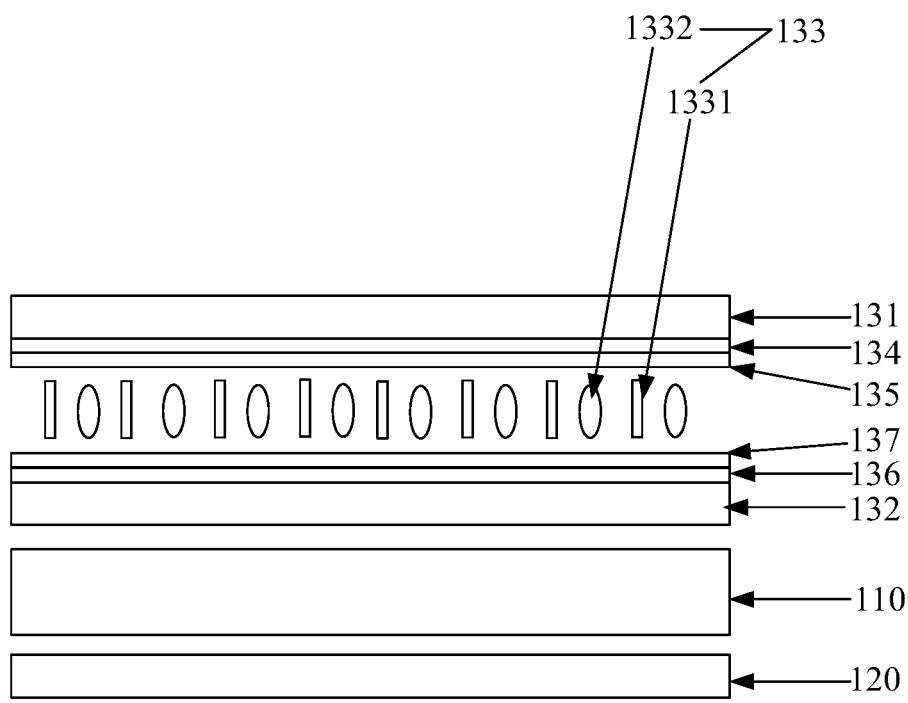
Figure 3:
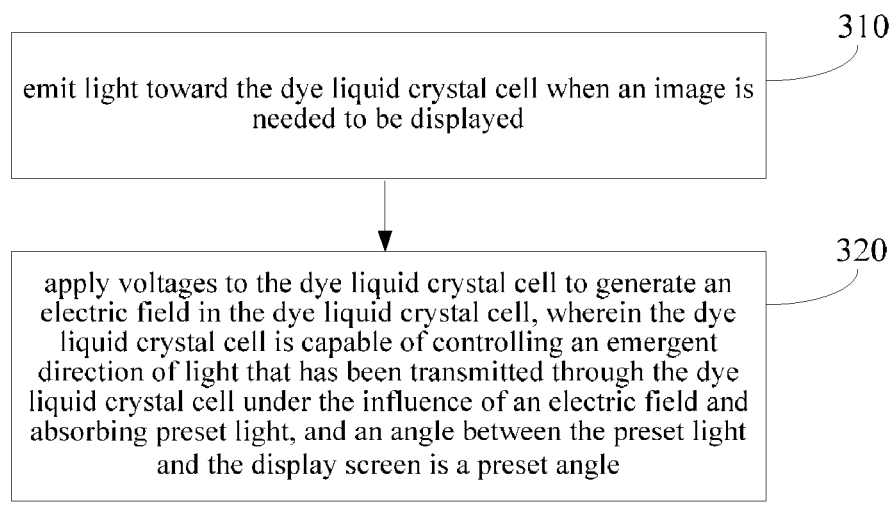

It should be noted that, the dye liquid crystal cell may also be arranged on a light emergent side of the display panel in the embodiment, and the light emergent side of the display panel is a side of the display panel far away from the backlight module. As shown in FIG. 2-3, the dye liquid crystal cell includes a first transparent substrate 131, a second transparent substrate 132 and a dye liquid crystal layer 133. The first transparent substrate 131 is oppositely arranged to the second transparent substrate 132, and the dye liquid crystal layer 133 is arranged between the first transparent substrate 131 and the second transparent substrate 132. A first conductive layer 134 is arranged on the first transparent substrate 131. A first alignment layer 135 is arranged on the first transparent substrate 131 on which the first conductive layer 134 has been arranged. A second conductive layer 136 is arranged on the second transparent substrate 132. A second alignment layer 137 is arranged on the second transparent substrate 132 on which the second conductive layer 136 has been arranged. The dye liquid crystal layer 133 includes dye stuff 1331 and nematic liquid crystals 1332. In FIG. 2-3, the reference sign 110 represents a display panel and the reference sign 120 represents a backlight module. For the working process of the display screen shown in FIG. 2-3, reference may be made to the related illustration in FIG. 2-1 and FIG. 2-2. Referring to FIG. 2-2, the display panel includes a first substrate 111 and a second substrate 112 arranged in a light entering direction (e.g., a direction indicated by the reference sign u shown in FIG. 2-2). Optionally, the second transparent substrate of the dye liquid crystal cell may be the second substrate 112 of the display panel.

It should be added that there are anti-sight glasses in the related art. However, if the user does not wear the anti-sight glasses, the user cannot see the content displayed on the display screen. Thus, the anti-sight glasses can ensure personal information security, but the convenience is poor. With the display screen according to the embodiment of the disclosure, the anti-sight purpose can be achieved and the personal information security can be ensured, even if the user does not wear the anti-sight glasses.

To sum up, for the display screen according to the embodiment of the disclosure, the display screen includes a dye liquid crystal cell, the dye liquid crystal cell is arranged on a side of the display panel, and the dye liquid crystal cell is capable of controlling an emergent direction of light that has been transmitted through the dye liquid crystal cell under the influence of an electric field. Therefore, the viewing angle can be varied continuously. As compared with the related art, the user does not need to view contents on the display screen plumb in the front face of the display screen, and there is no need to provide a privacy film. As a result, it improves the anti-sight flexibility and improves the display quality, and is of high convenience.

A display device is provided according to an embodiment of the disclosure, which includes the display screen shown in FIG. 1, FIG. 2-1, FIG. 2-2 or FIG. 2-3.

To sum up, for the display device according to the embodiment of the disclosure, the display screen of the display device includes a dye liquid crystal cell, the dye liquid crystal cell is arranged on a side of the display panel, and the dye liquid crystal cell is capable of controlling an emergent direction of light that has been transmitted through the dye liquid crystal cell under the influence of an electric field. Therefore, the viewing angle can be varied continuously. As compared with the related art, the user does not need to view contents on the display screen plumb in the front face of the display screen, and there is no need to provide a privacy film. As a result, it improves the anti-sight flexibility and improves the display quality, and is of high convenience A display method is provided according to an embodiment of the disclosure, the display method is applied to the display screen shown in FIG. 1, FIG. 2-1, FIG. 2-2 or FIG. 2-3, the display screen includes a display panel and a dye liquid crystal cell, the dye liquid crystal cell is arranged on a side of the display panel. As shown in FIG. 3, the display method includes the following steps.

Step 310: emitting light to the dye liquid crystal cell when an image is needed to be displayed; and Step 320: applying voltages to the dye liquid crystal cell to generate an electric field in the dye liquid crystal cell, where the dye liquid crystal cell is capable of controlling an emergent direction of light that has been transmitted through the dye liquid crystal cell under the influence of an electric field and absorbing preset light, and an angle between the preset light and the display screen is a preset angle.

To sum up, for the display method according to the embodiment of the disclosure, when an image is needed to be displayed, the light is emitted to the dye liquid crystal cell, and a voltage is applied to the dye liquid crystal cell to generate an electric field in the dye liquid crystal cell, the dye liquid crystal cell is capable of controlling an emergent direction of light that has been transmitted through the dye liquid crystal cell under the influence of an electric field and absorbing the preset light, and an angle between the preset light and the display screen is a preset angle. Therefore, as compared with the related art, the user does not need to view contents on the display screen plumb in the front face of the display screen, and the anti-sight flexibility is improved.

Optionally, the dye liquid crystal cell is arranged on a light entering side of the display panel, as shown in FIG. 2-1, the dye liquid crystal cell includes: a first transparent substrate 131, a second transparent substrate 132 and a dye liquid crystal layer 133. The first transparent substrate 131 is oppositely arranged to the second transparent substrate 132, and the dye liquid crystal layer 133 is arranged between the first transparent substrate 131 and the second transparent substrate 132. A first conductive layer 134 is arranged on the first transparent substrate 131, and a first alignment layer 135 is arranged on the first transparent substrate 131 on which the first conductive layer 134 has been arranged. A second conductive layer 136 is arranged on the second transparent substrate 132, and a second alignment layer 137 is arranged on the second transparent substrate 132 on which the second conductive layer 136 has been arranged. Correspondingly, the step 320 includes: applying voltages to the first transparent substrate 131 and the second transparent substrate 132 to generate an electric field in the dye liquid crystal cell.

As shown in FIG. 2-2, the display panel 110 includes a first substrate 111 and a second substrate 112 arranged in a light entering direction, and the first transparent substrate may be the first substrate 111.

As shown in FIG. 2-1 and FIG. 2-2, the display screen 100 further includes a backlight module 120, and emitting the light to the dye liquid crystal cell includes: controlling the backlight module to emit the light toward the dye liquid crystal cell.

The light entering side of the display panel is a side of the display panel close to the backlight module.

When the applied voltage changes, the intensity of the electric field between the first transparent substrate and the second transparent substrate changes. When the intensity of the electric field changes, the dye stuff and the nematic liquid crystals are deflected together. The portion of light (for which an angle between the portion of light and the display screen is a preset angle) emitted by the backlight module and incident on the outer wall of a rod-like dye stuff is absorbed by the dye, reducing the viewing angle and achieving anti-sight purpose. The portion of light emitted by the backlight module and incident on the nematic liquid crystals is transmitted in the axial direction of the nematic liquid crystals, and the axial direction of the nematic liquid crystals changes continuously, so as to change the viewing angle continuously.

Optionally, the dye liquid crystal cell may also be arranged on a light emergent side of the display panel in the embodiment, and the light emergent side of the display panel is a side of the display panel far away from the backlight module. The display panel includes a first substrate and a second substrate arranged in a light entering direction. In the case that the dye liquid crystal cell is arranged on the light emergent side of the display panel, the second transparent substrate of the dye liquid crystal cell may be the second substrate of the display panel.

Optionally, both the first conductive layer and the second conductive layer are ITO layers.

Optionally, both the first alignment layer and the second alignment layer are PI layers.

Optionally, the dye liquid crystal layer includes dye stuff and nematic liquid crystals, and the dye stuff is capable of absorbing the preset light.

Optionally, a display mode of the nematic liquid crystals is an electrically controlled birefringence mode.

To sum up, for the display method according to the embodiment of the disclosure, when an image is needed to be displayed, light is emitted to the dye liquid crystal cell, and voltages are applied to the dye liquid crystal cell to generate an electric field in the dye liquid crystal cell, the dye liquid crystal cell is capable of controlling an emergent direction of light that has been transmitted through the dye liquid crystal cell under the influence of the electric field and absorbing preset light, and an angle between the preset light and the display screen is a preset angle. Therefore, as compared with the related art, the user does not need to view contents on the display screen plumb in the front face of the display screen, and there is no need to provide a privacy film, improving the anti-sight flexibility and improving the display quality.

Figures 1, 4:
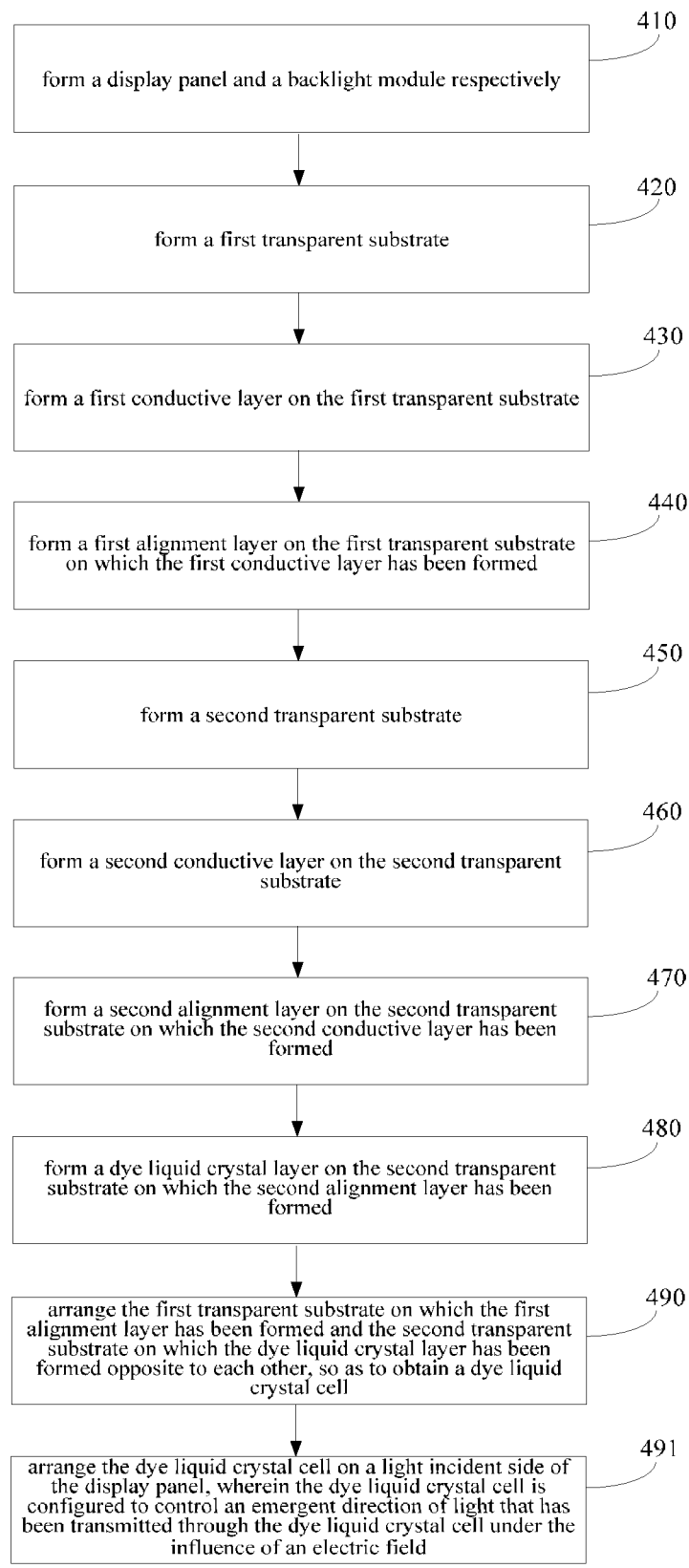
Figures 2, 4:
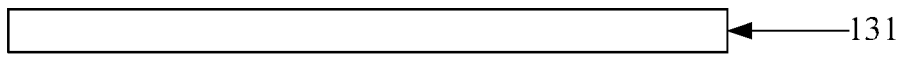
Figures 3, 4:
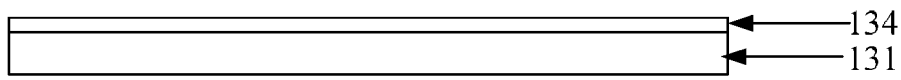
Figure 4:
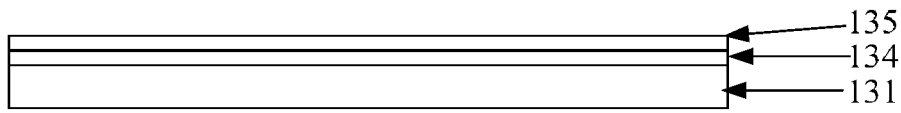

A method for manufacturing a display screen is further provided according to an embodiment of the disclosure, as shown in FIG. 4-1, which includes the following steps.

In step 410, a display panel and a backlight module are formed respectively.

Reference may be made to the related art for the process of forming the display panel and the backlight module, which is not set forth any more herein. As shown in FIG. 2-2, the display panel includes a first substrate and a second substrate arranged in a light entering direction.

In step 420, a first transparent substrate is formed.

As shown in FIG. 4-2, a first transparent substrate 131 is formed. By way of example, the first transparent substrate may be a glass substrate, or may also be a PET substrate.

It should be added that, the first substrate 111 of the display panel 110 shown in FIG. 2-2 may be directly used as the first transparent substrate, and there is no need to form the first transparent substrate additionally.

In step 430, a first conductive layer is formed on the first transparent substrate.

As shown in FIG. 4-3, a first conductive layer 134 is formed on the first transparent substrate 131.

By way of example, the first conductive layer is an ITO layer.

In step 440, a first alignment layer is formed on the first transparent substrate on which the first conductive layer is formed.

As shown in FIG. 4-4, a first alignment layer 135 is formed on the first transparent substrate 131 on which the first conductive layer 134 is formed. By way of example, the first alignment layer is a PI layer.

In step 450, a second transparent substrate is formed.

Figures 4, 5:
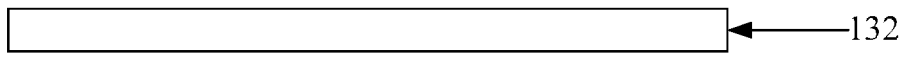

As shown in FIG. 4-5, a second transparent substrate 132 is formed. By way of example, the second transparent substrate may be a glass substrate, or may also be a PET substrate.

In step 460, a second conductive layer is formed on the second transparent substrate.

Figures 4, 5, 6:
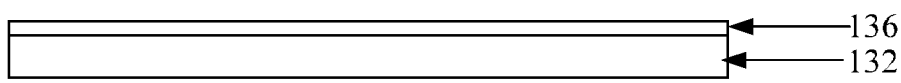
Figures 4, 5, 6, 7:
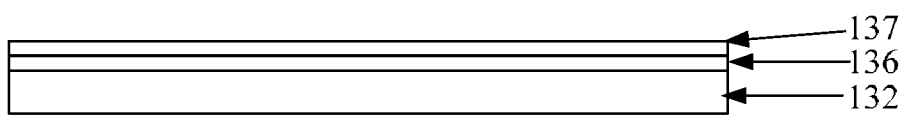
Figures 4, 5, 6, 7, 8:
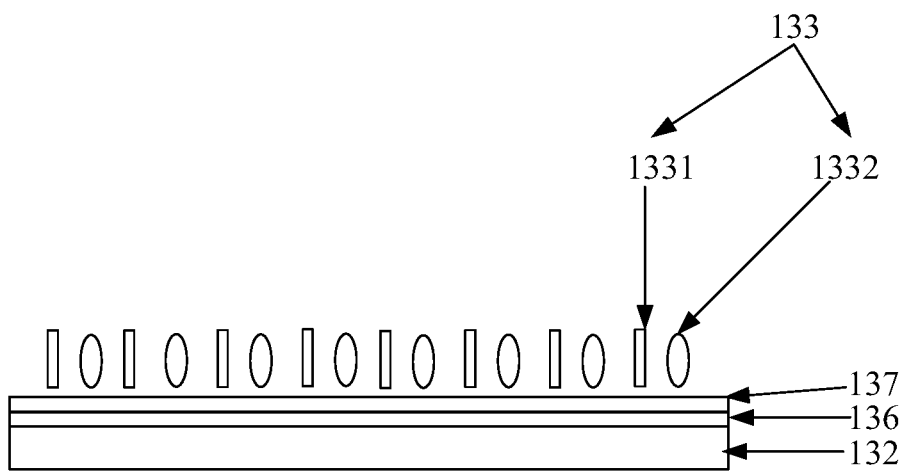
Figures 4, 5, 6, 7, 8, 9:
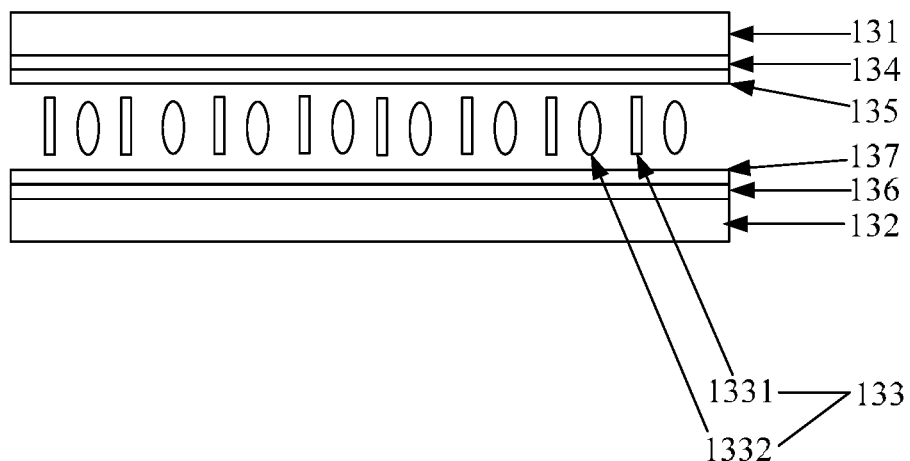

As shown in FIG. 4-6, a second conductive layer 136 is formed on the second transparent substrate 132.

By way of example, the second conductive layer is an ITO layer.

In step 470, a second alignment layer is formed on the second transparent substrate on which the second conductive layer has been formed.

As shown in FIG. 4-7, a second alignment layer 137 is formed on the second transparent substrate 132 on which the second conductive layer 136 has been formed.

By way of example, the second alignment layer is a PI layer.

In step 480, a dye liquid crystal layer is formed on the second transparent substrate on which the second alignment layer has been formed.

As shown in FIG. 4-8, a dye liquid crystal layer 133 is formed on the second transparent substrate 132 on which the second alignment layer 137 has been formed. The dye liquid crystal layer 133 comprises dye stuff 1331 and nematic liquid crystals 1332. Specifically, the dye stuff and the nematic liquid crystals may be mixed and dropped on the second transparent substrate on which the second alignment layer has been formed.

A display mode of the nematic liquid crystals is an electrically controlled birefringence mode. In this display mode, the dye stuff and the nematic liquid crystals are changed together with the change of the electric field in the dye liquid crystal cell.

In the case that the light emitted by the backlight module is incident on the outer wall of a rod-like dye stuff, the light may be absorbed by the dye. In the case that the light emitted by the backlight module is incident on the nematic liquid crystals along the symmetrical axis of the nematic liquid crystals, an entirety of the light may be transmitted through the nematic liquid crystals.

It should be added that, a dye liquid crystal layer may be formed on the second transparent substrate on which the second alignment layer has been formed, or may also be formed on the first transparent substrate on which the first alignment layer has been formed.

In step 490, the first transparent substrate on which the first alignment layer has been formed is oppositely arranged to the second transparent substrate on which the dye liquid crystal layer has been formed, so as to obtain a dye liquid crystal cell.

As shown in FIG. 4-9, the first transparent substrate 131 on which the first alignment layer 135 is formed is oppositely arranged to the second transparent substrate 132 on which the dye liquid crystal layer 133 is formed, so as to obtain a dye liquid crystal cell 130.

In FIG. 4-9, the reference sign 134 represents the first conductive layer, the reference sign 136 represents the second conductive layer, the reference sign 137 represents the second alignment layer, the reference sign 1331 represents the dye stuff, and the reference sign 1332 represents the nematic liquid crystals.

In step 491, the dye liquid crystal cell is arranged on a light entering side of the display panel, and the dye liquid crystal cell is configured to control an emergent direction of light that has been transmitted through the dye liquid crystal cell under the influence of an electric field.

The light entering side of the display panel is a side of the display panel close to the backlight module.

As shown in FIG. 2-1 and FIG. 2-2, the dye liquid crystal cell 130 is arranged on a light entering side of the display panel 110, and the dye liquid crystal cell 130 is configured to control an emergent direction of light that has been transmitted through the dye liquid crystal cell 130 under the influence of an electric field. The backlight module 120 is configured to emit light toward the dye liquid crystal cell 130.

Specifically, when an image is needed to be displayed, the backlight module is controlled by the control unit to emit light toward the dye liquid crystal cell, and the voltages are applied to the first transparent substrate and the second transparent substrate to generate an electric field between the first transparent substrate and the second transparent substrate. With the change of the voltages applied to the first transparent substrate and the second transparent substrate, the intensity of the electric field between the first transparent substrate and the second transparent substrate changes. When the intensity of the electric field changes, the dye stuff and the nematic liquid crystals are deflected together. The portion of light emitted by the backlight module and incident on the outer wall of a rod-like dye stuff is absorbed by the dye stuff, reducing the viewing angle and achieving anti-sight purpose. The portion of light emitted by the backlight module and incident on the nematic liquid crystals is transmitted in the axial direction of the nematic liquid crystals, and the axial direction of the nematic liquid crystals changes continuously, so as to change the viewing angle continuously.

Additionally, in step 491, the dye liquid crystal cell may also be arranged on a light emergent side of the display panel, as shown in FIG. 2-3. The light emergent side of the display panel is a side of the display panel far away from the backlight module. Correspondingly, in step 450, the second substrate 112 of the display panel 110 shown in FIG. 2-2 may be directly used as the second transparent substrate of the dye liquid crystal cell, and there is no need to form the second transparent substrate additionally.

It should be noted that the steps in the method for manufacturing the display screen according to the embodiment of the disclosure may be properly adjusted in order, for example, there is no specific order between step 420 and step 450, and the number of steps may be increased or decreased according to the actual situation. Variations can readily occur to a person skilled in the art within the technical scope of the disclosure, which all fall into the protective scope of the disclosure, and are not set forth any more.

To sum up, for the method for manufacturing the display screen according to the embodiment of the disclosure, the manufactured display screen includes a dye liquid crystal cell, the dye liquid crystal cell is capable of controlling an emergent direction of light that has been emitted by the backlight module and has been transmitted through the dye liquid crystal cell under the influence of an electric field. Therefore, the viewing angle can be varied continuously. As compared with the related art, the user does not need to view contents on the display screen plumb in the front face of the display screen, and there is no need to provide a privacy film, improving the anti-sight flexibility and improving the display quality.

A person skilled in the art may understand that: all or part of the steps achieving the above-described embodiments may be carried out by hardware, or may also be carried out by relevant hardware instructed by programs. The programs may be stored in a computer readable storage medium. The aforementioned storage medium may be a read-only memory, a magnetic disk, an optical disk or the like.

The above are merely the preferred embodiments of the present disclosure, but the present disclosure is not limited thereto. Obviously, a person skilled in the art may make further modifications, substitutions and improvements without departing from the spirit of the present disclosure, and these modifications and improvements shall also fall within the scope of the present disclosure.

The invention claimed is:

1. A display screen, comprising: a display panel and a dye liquid crystal cell, wherein
the dye liquid crystal cell is arranged on only one side of the display panel, the display panel is not a dye liquid crystal cell, and the dye liquid crystal cell is configured to control an emergent direction of light that has been transmitted through the dye liquid crystal cell under the influence of an electric field, to enable a viewing angle of the display screen to be varied continuously by the dye liquid crystal cell in a case that the electric field is generated continuously;
the dye liquid crystal cell is arranged on a light entering side of the display panel, and the dye liquid crystal cell comprises a first transparent substrate, a second transparent substrate and a dye liquid crystal layer;
the first transparent substrate and the second transparent substrate are arranged opposite to each other, and the dye liquid crystal layer is arranged between the first transparent substrate and the second transparent substrate;
a first conductive layer is arranged on the first transparent substrate and in direct contact with the first transparent substrate;
a first alignment layer is arranged on the first transparent substrate on which the first conductive layer has been arranged, and is in direct contact with the first conductive layer;
a second conductive layer is arranged on the second transparent substrate and in direct contact with the second transparent substrate;
a second alignment layer is arranged on the second transparent substrate on which the second conductive layer has been arranged, and is in direct contact with the second conductive layer; and
both the first alignment layer and the second alignment layer are in direct contact with the dye liquid crystal layer,
wherein the display panel comprises a first substrate and a second substrate arranged in a light entering direction, the first substrate and the second substrate are spaced apart from each other, and the first transparent substrate is the first substrate.

2. The display screen according to claim 1, wherein the dye liquid crystal layer comprises a dye stuff and nematic liquid crystals.

3. The display screen according to claim 2, wherein a display mode of the nematic liquid crystals is an electrically controlled birefringence mode.

4. The display screen according to claim 1, further comprising:
a backlight module, configured to emit light toward the dye liquid crystal cell.

5. The display screen according to claim 4, wherein the dye liquid crystal layer comprises a dye stuff and nematic liquid crystals, the dye stuff is configured to absorb a portion of light emitted by the backlight module, and an angle between the portion of light and the display screen is a preset angle.

6. The display screen according to claim 1, wherein the first transparent substrate and the second transparent substrate are glass substrates or polyethylene terephthalate (PET) substrates.

7. The display screen according to claim 1, wherein
the first conductive layer and the second conductive layer are indium tin oxide (ITO) layers, and the first alignment layer and the second alignment layer are polyimide (PI) layers.

8. A display device, comprising a display screen, wherein the display screen comprises a display panel and a dye liquid crystal cell;
the dye liquid crystal cell is arranged on only one side of the display panel, the display panel is not a dye liquid crystal cell, and the dye liquid crystal cell is configured to control an emergent direction of light that has been transmitted through the dye liquid crystal cell under the influence of an electric field, to enable a viewing angle of the display screen to be varied continuously by the dye liquid crystal cell in a case that the electric field is generated continuously;
the dye liquid crystal cell is arranged on a light entering side of the display panel, and the dye liquid crystal cell comprises a first transparent substrate, a second transparent substrate and a dye liquid crystal layer;
the first transparent substrate and the second transparent substrate are arranged opposite to each other, and the dye liquid crystal layer is arranged between the first transparent substrate and the second transparent substrate;
a first conductive layer is arranged on the first transparent substrate and in direct contact with the first transparent substrate;
a first alignment layer is arranged on the first transparent substrate on which the first conductive layer has been arranged, and is in direct contact with the first conductive layer;
a second conductive layer is arranged on the second transparent substrate and in direct contact with the second transparent substrate; and
a second alignment layer is arranged on the second transparent substrate on which the second conductive layer has been arranged, and is in direct contact with the second conductive layer; and
both the first alignment layer and the second alignment layer are in direct contact with the dye liquid crystal layer,
wherein the display panel comprises a first substrate and a second substrate arranged in a light entering direction, the first substrate and the second substrate are spaced apart from each other, and the first transparent substrate is the first substrate.

9. The display device according to claim 8, wherein the dye liquid crystal layer comprises a dye stuff and nematic liquid crystals.

10. The display device according to claim 9, wherein a display mode of the nematic liquid crystals is an electrically controlled birefringence mode.

11. A display method for a display screen, wherein the display screen comprises: a display panel and a dye liquid crystal cell, the dye liquid crystal cell is arranged on only one side of the display panel, the display panel is not a dye liquid crystal cell, and the dye liquid crystal cell is configured to control an emergent direction of light that has been transmitted through the dye liquid crystal cell under the influence of an electric field, to enable a viewing angle of the display screen to be varied continuously by the dye liquid crystal cell in a case that the electric field is generated continuously; the dye liquid crystal cell is arranged on a light entering side of the display panel, the dye liquid crystal cell comprises a first transparent substrate, a second transparent substrate and a dye liquid crystal layer, the first transparent substrate and the second transparent substrate are arranged opposite to each other, the dye liquid crystal layer is arranged between the first transparent substrate and the second transparent substrate, a first conductive layer is arranged on the first transparent substrate and in direct contact with the first transparent substrate, a first alignment layer is arranged on the first transparent substrate on which the first conductive layer has been arranged and is in direct contact with the first conductive layer, a second conductive layer is arranged on the second transparent substrate and in direct contact with the second transparent substrate, a second alignment layer is arranged on the second transparent substrate on which the second conductive layer has been arranged and is in direct contact with the second conductive layer, and both the first alignment layer and the second alignment layer are in direct contact with the dye liquid crystal layer,
wherein the display panel comprises a first substrate and a second substrate arranged in a light entering direction, the first substrate and the second substrate are spaced apart from each other, and the first transparent substrate is the first substrate;
the display method comprises:
emitting light to the dye liquid crystal cell in the case that an image is needed to be displayed; and
applying voltages to the dye liquid crystal cell to generate an electric field in the dye liquid crystal cell, wherein the dye liquid crystal cell is capable of controlling an emergent direction of light that has been transmitted through the dye liquid crystal cell under the influence of the electric field and absorbing preset light, and an angle between the preset light and the display screen is a preset angle.

12. The display method according to claim 11, wherein applying the voltages to the dye liquid crystal cell to generate the electric field in the dye liquid crystal cell comprises: applying the voltages to the first conductive layer and the second conductive layer to generate the electric field in the dye liquid crystal cell.

13. The display method according to claim 12, wherein the dye liquid crystal layer comprises a dye stuff and nematic liquid crystals, and the dye stuff is capable of absorbing the preset light.

14. The display method according to claim 13, wherein a display mode of the nematic liquid crystals is an electrically controlled birefringence mode.

15. The display method according to claim 11, wherein the display screen further comprises a backlight module; and
emitting the light to the dye liquid crystal cell comprises: controlling the backlight module to emit the light toward the dye liquid crystal cell.

* * * * *